UNITED STATES PATENT OFFICE.

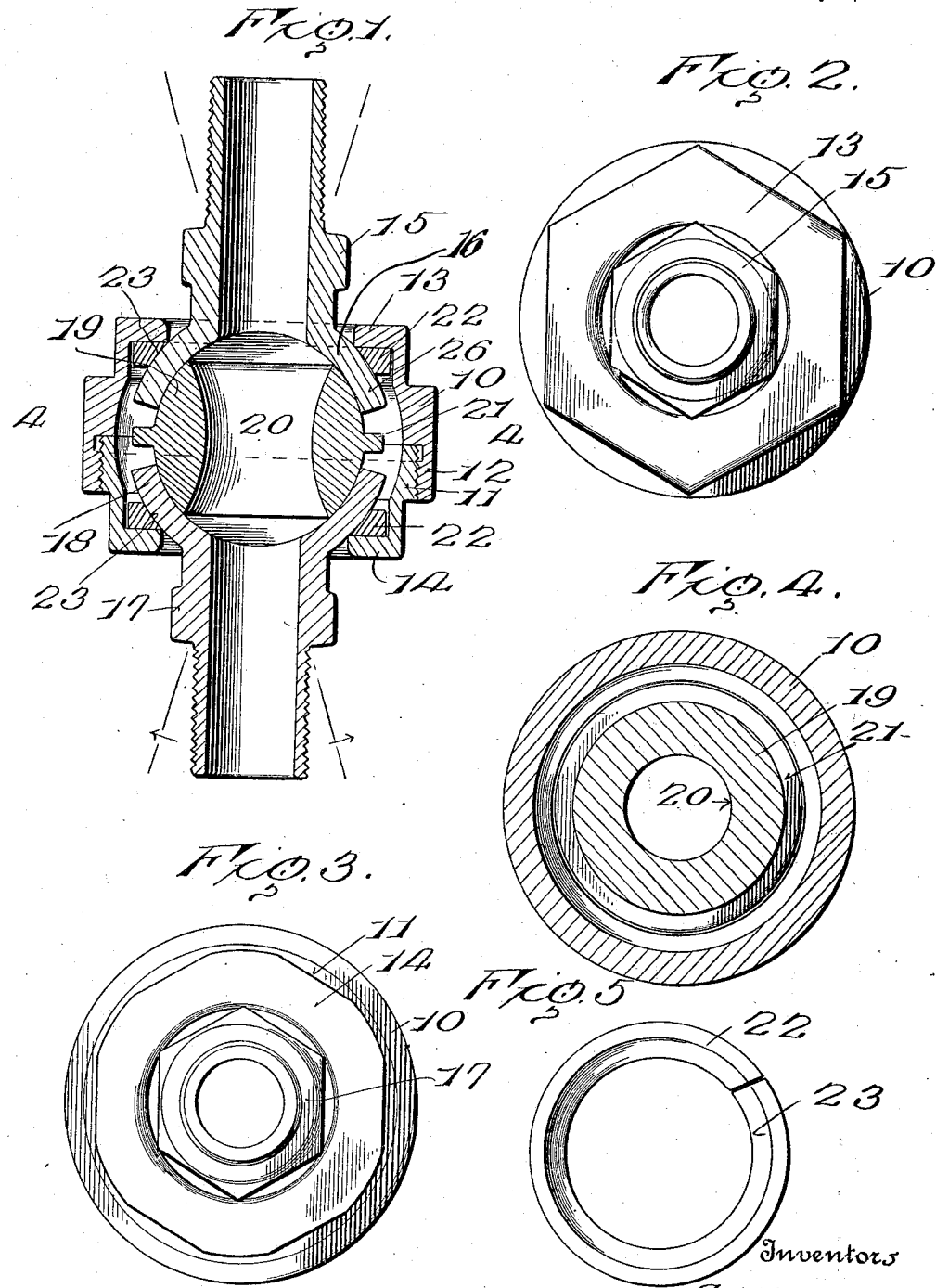

GEORGE H. LANGTON AND JOHN W. SMALL, OF PORTSMOUTH, VIRGINIA.

FLEXIBLE PIPE-COUPLING.

1,271,179.     Specification of Letters Patent.     Patented July 2, 1918.

Application filed July 18, 1917. Serial No. 181,369.

*To all whom it may concern:*

Be it known that we, GEORGE H. LANGTON and JOHN W. SMALL, citizens of the United States, residing at Portsmouth, in the county of Norfolk and State of Virginia, have invented certain new and useful Improvements in Flexible Pipe-Couplings, of which the following is a specification.

This invention relates to an improved flexible pipe coupling particularly designed for use in connection with the various pipe systems of railway rolling stock and has as its primary object to provide a construction wherein a tight joint will, without the use of gaskets or other packing, be maintained between the coacting pipe sections of the coupling while at the same time the said sections will be free to rotate or oscillate independently of each other.

The invention has as a further object to provide an improved type of combined seating and tensioning rings for the coacting pipe sections of the coupling and wherein the tension of the said rings may be easily varied.

And the invention has as a still further object to provide an improved casing or body for the coupling of such nature that the said coupling may be easily taken apart and the coacting pipe sections of the coupling disengaged.

Other and incidental objects will appear as the description proceeds and in the drawings wherein we have illustrated the preferred embodiment of the invention and wherein similar reference characters designate corresponding parts throughout the several views:

Figure 1 is a vertical sectional view of our improved pipe coupling particularly illustrating the construction of the body of the device as well as the mounting of the tensioning rings for the coacting pipe sections of the coupling, Fig. 2 is a top plan view of the coupling, Fig. 3 is a bottom plan view of the coupling, Fig. 4 is a transverse sectional view taken on the line 4—4 of Fig. 1 and looking in the direction of the arrows, this view particularly illustrating the annular flange formed on the bearing member or union of the coupling, and Fig. 5 is a plan view showing one of the tensioning rings of the coupling in detail.

In carrying out the invention, the improved coupling is formed with a body or casing constructed of coacting sections 10 and 11 which, as shown in Figs. 2 and 3 of the drawings, are provided at their outer extremities with suitable wrench receiving faces. At its inner extremity the section 10 is cut away to provide an annular flange 12 into which is screw threaded the inner extremity of the section 11. The sections of the body of the coupling are thus adjustably connected. Formed on the outer extremity of the section 10 is an inwardly directed annular flange 13. The section 11 is provided at its outer extremity with a similar flange 14.

Freely fitted through the flange 13 of the section 10 of the body of the coupling is a pipe section 15 screw threaded at its outer extremity for connection with a main pipe line and flared at its inner extremity to form a substantially semispherical socket 16. A similar pipe section 17 is freely fitted through the flange 14 of the section 11 of the body. This pipe section 17 is also screw threaded at its outer extremity for connection with a main pipe line and at its inner extremity is flared to provide a substantially semispherical socket 18 confronting the socket 16 of the pipe section 15 and identical therewith.

Interposed between the sockets 16 and 18 of the pipe sections 15 and 17 is a substantially spherical union or bearing member 19 having a diametric opening or passage 20 therethrough. This passage is, as particularly shown in Fig. 1 of the drawings, enlarged at its extremities. Extending around the bearing member is a circumscribing lateral flange 21 disposed between the inner ends of the sockets 16 and 18 and arranged in a plane at substantially right angles to the passage 20 through the bearing member.

Removably fitted within the sections 10 and 11 of the body of the coupling are combined seating and tensioning rings 22 resting against the flanges 13 and 14 of the said sections and interposed between the said flanges and the sockets 16 and 18 of the pipe sections. The rings 22 are preferably formed of suitable resilient material and are split to thus yieldably engage around the said sockets. Formed on the inner sides of the said rings are beveled faces 23 against which the sockets of the pipe sections seat.

As will now be clear, the section 11 of the body of the coupling may be adjusted inwardly upon the section 10 thereof for clamping the sockets 16 and 18 of the pipe sections against the bearing member 19. At the same time, the tensioning rings 22 will be moved toward the larger ends of the said sockets and will consequently be spread for yieldably holding the said sockets in engagement with the bearing member. A tight joint between the pipe sections will thus at all times be had. Furthermore, it will be seen that since the tensioning rings provide seats in which the pipe sections are adapted to be rotated or oscillated with respect to the bearing member and are expanded to yieldably engage with the said sockets, the rings will act to tension the pipe sections in their rotary or oscillatory movements. The tension of the said rings may, furthermore, be varied by adjusting the sections of the body of the device one upon the other.

Attention is now directed to Fig. 1 of the drawings wherein it is observed that when either of the pipe sections 15 or 17 is oscillated, the pipe section so moved will engage the flange 21 of the bearing member 19 to accordingly shift the said bearing member therewith. Consequently, the flange 21 will act to always maintain the passage 20 through the said bearing member in register with the passages of the pipe sections and since the passage 20 is enlarged at its extremities, unobstructed communication will be maintained between the pipe sections without respect to the relative position of the said sections.

It will therefore be seen that we provide a particularly simple and efficient construction for the purpose set forth and a pipe coupling wherein the use of gaskets or other similar packing is eliminated. Furthermore, the body of the device is of such nature that the coupling may be easily taken apart and the coacting pipe sections thereof disengaged.

Having thus described the invention, what is claimed as new is:

1. A flexible pipe coupling including a body split medially to provide coacting sections connected at their inner extremities, flanges formed on the outer extremities of the sections and projecting radially inward, coacting pipe sections fitted through the outer ends of the body sections and formed at their inner extremities with confronting sockets, a bearing member interposed between the pipe sections and engaging in said sockets, and seating rings for the pipe sections interposed between the sockets and the said flanges, the said rings being freely shiftable within the body for removal at the inner ends of the body sections.

2. A flexible pipe coupling including a sectional body internally chambered from end to end thereof, flanges formed on the outer extremities of the sections of the body and projecting radially inward to overhang said chamber, the said chamber being open and unobstructed between the inner faces of said flanges, coacting pipe sections fitted through the ends of the body and formed at their inner extremities with confronting sockets, a bearing member interposed between the pipe sections and engaging in said sockets, and seating rings for the pipe sections interposed between the sockets and the said flanges and held against inward displacement within the said chamber of the body by the said sockets.

3. A flexible pipe coupling including a sectional body, flanges formed on the outer extremities of the sections of the body and projecting radially inward, the body being internally open and unobstructed between the said flanges to form an annular chamber, seating rings fitted within the sections from the inner ends thereof to lie against the said flanges and freely shiftable within the said chamber to be removed at the inner ends of the sections, coacting pipe sections fitted through the outer ends of the sections of the body and formed at their inner extremities with confronting sockets engaging said seating rings, and a bearing member interposed between the pipe sections to coact with said sockets and formed with an annular flange freely received within said chamber, the said flange being interposed between the inner ends of the said sockets for maintaining the bearing member in position establishing communication between the pipe sections.

In testimony whereof we affix our signatures.

GEORGE H. LANGTON. [L. S.]
JOHN W. SMALL. [L. S.]

Copies of this patent may be obtained for five cents each, by addressing the "Commissioner of Patents, Washington, D. C."